: (12) United States Patent
Nakagawa

(10) Patent No.: US 10,394,172 B2
(45) Date of Patent: Aug. 27, 2019

(54) COMING-OFF STOPPING MECHANISM, FIXING DEVICE AND IMAGE FORMING APPARATUS

(71) Applicant: KYOCERA Document Solutions Inc., Osaka (JP)

(72) Inventor: Takafumi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/127,329

(22) Filed: Sep. 11, 2018

(65) Prior Publication Data
US 2019/0094774 A1 Mar. 28, 2019

(30) Foreign Application Priority Data
Sep. 28, 2017 (JP) .................. 2017-188206

(51) Int. Cl.
*G03G 15/20* (2006.01)
*G03G 21/16* (2006.01)
*F16B 2/24* (2006.01)
*F16B 21/18* (2006.01)

(52) U.S. Cl.
CPC .......... *G03G 15/2064* (2013.01); *F16B 2/245* (2013.01); *F16B 21/186* (2013.01); *G03G 15/2053* (2013.01); *G03G 21/1647* (2013.01)

(58) Field of Classification Search
None
See application file for complete search history.

(56) References Cited

U.S. PATENT DOCUMENTS

| 7,433,643 | B2 | 10/2008 | Matsuno et al. |
| 7,756,460 | B2 | 7/2010 | Matsuno et al. |
| 2017/0168436 | A1* | 6/2017 | Ogino ................ G03G 15/2053 |

FOREIGN PATENT DOCUMENTS

JP 2007-057644 A 3/2007

\* cited by examiner

*Primary Examiner* — Victor Verbitsky
(74) *Attorney, Agent, or Firm* — Studebaker & Brackett PC

(57) ABSTRACT

A coming-off stopping mechanism includes a supporting member and a coming-off stopping member. The tubular supporting member elongated in an axial direction has a notch portion at an end and supports a rotating body. The coming-off stopping member is fitted to the supporting member from the outside in the axial direction, and restrains movement of the rotating body toward the outside. The coming-off stopping member includes an annular portion and a plurality of first engaging portions. The annular portion is formed so as to enclose the outside in a diameter direction of the supporting member except for the notch portion. The plurality of first engaging portions is connected to both ends of the annular portion, and is inserted into the inside of the supporting member from the notch portion while elastically deforming and fitted into a plurality of first engaging holes formed in the supporting member from the inside.

15 Claims, 9 Drawing Sheets

COMING-OFF STOPPING MECHANISM, FIXING DEVICE AND IMAGE FORMING APPARATUS

INCORPORATION BY REFERENCE

This application is based on and claims the benefit of priority from Japanese Patent application No. 2017-188206 filed on Sep. 28, 2017, the entire contents of which are incorporated herein by reference.

BACKGROUND

The present disclosure relates to a coming-off stopping mechanism, a fixing device and an image forming apparatus.

Conventionally, an image forming apparatus of an electrographic manner includes a fixing device fixing a toner image onto a recording medium, such as a sheet.

For example, the fixing device includes a fixing roller rotatable around an axis center in which a halogen lamp is provided, and a pressuring roller rotatable around an axis center fixing a nip part between the fixing roller and the pressuring roller. The fixing device carries out fixing process heating the toner image on the sheet by feeding the sheet to the nip part. Moreover, the fixing device includes an annular heat insulating member fitted from the outside concentrically with the fixing roller, a bearing fitted at the outside of the annular heat insulating member and a C-shaped coming-off stopping ring stopping coming-off of the annular heat insulating member. The C-shaped coming-off stopping ring is fitted from the outside of the fixing roller and supported at three points on an outer circumference face of the fixing roller.

However, because the C-shaped coming-off stopping ring is fitted from the outside of the fixing roller, the C-shaped coming-off stopping ring may receive force in a rotating direction in accordance with rotation of the fixing roller, and thereby, a diameter of the C-shaped coming-off stopping ring may be broadened. As a result, the C-shaped coming-off stopping ring may be come off from the fixing roller. Moreover, because the C-shaped coming-off stopping ring is fitted while being rubbed on the outer circumference face of the fixing roller, the C-shaped coming-off stopping ring may damage the outer circumference face of the fixing roller.

SUMMARY

In accordance with an embodiment of the present disclosure, a coming-off stopping mechanism includes a supporting member and a coming-off stopping member. The supporting member is formed in a hollow tubular shape elongated in an axial direction, has a notch portion at an end, and supports a rotating body rotating around an axis. The coming-off stopping member is fixed by being fitted to the supporting member from the outside in the axial direction, and restrains movement toward the outside in the axial direction of the rotating body supported by the supporting member. The coming-off stopping member includes an annular portion and a plurality of first engaging portions. The annular portion is formed so as to enclose the outside of the supporting member except for the notch portion. The plurality of first engaging portions is connected to both ends of the annular portion, and is inserted into the inside of the supporting member from the notch portion while elastically deforming and fitted into a plurality of first engaging holes formed in the supporting member from the inside.

In accordance with an embodiment of the present disclosure, a fixing device includes a fixing member, a pressuring member and the above-mentioned coming-off stopping mechanism. The fixing member heats a toner on a medium while rotating around an axis. The pressuring member forms a pressuring area between the fixing member and the pressuring member while rotating around an axis to pressure the toner on the medium passing through the pressuring area. The supporting member is arranged in a state penetrating the fixing member in the axis direction. The rotating body is attached to an end in the axial direction of the fixing member.

In accordance with an embodiment of the present disclosure, an image forming apparatus includes the above-mentioned fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
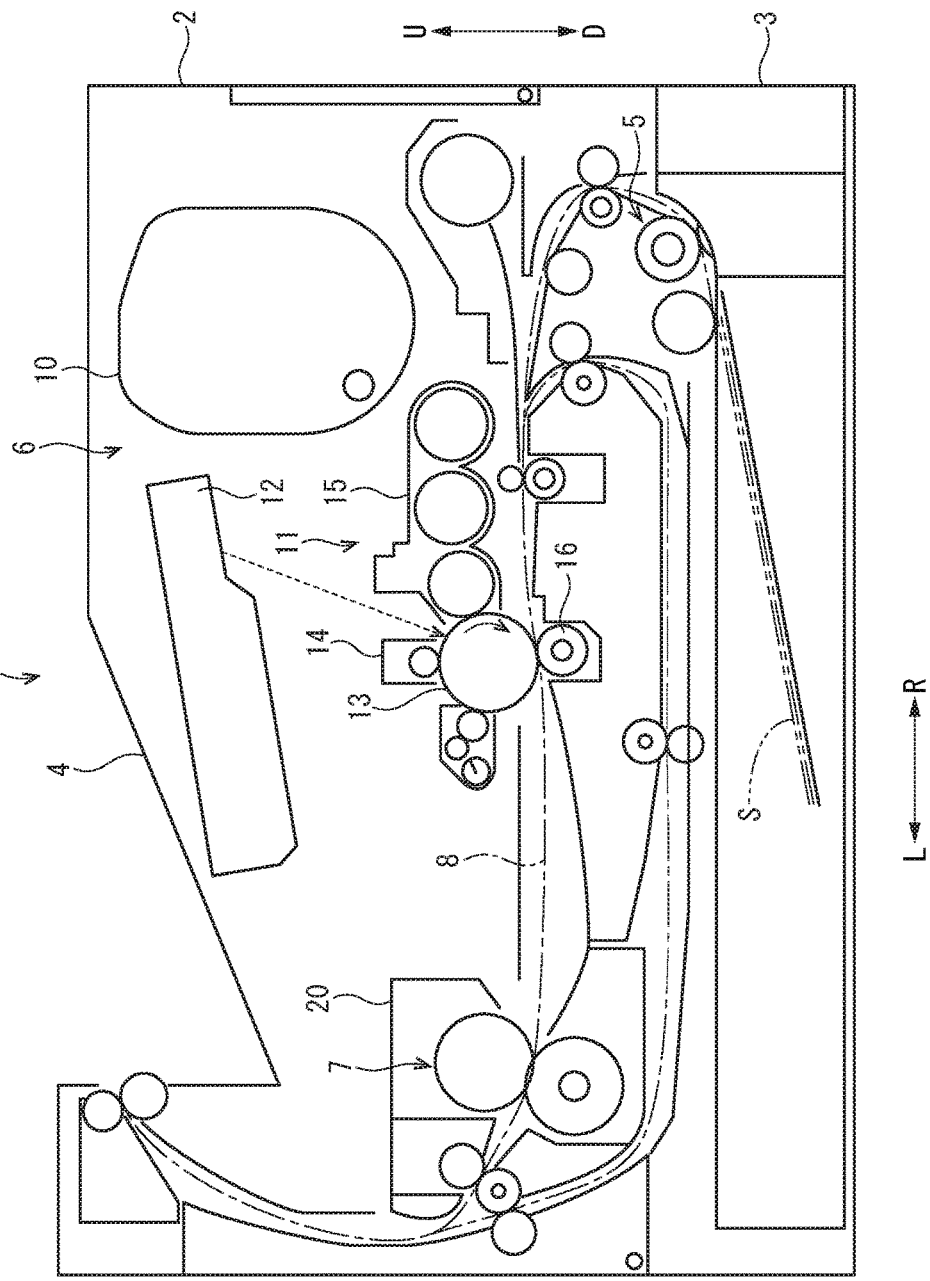
FIG. 1 is a sectional view schematically showing an internal structure of a printer according to an embodiment of the present disclosure.

Hereinafter, an embodiment of the present disclosure will be described with reference to the accompanying drawings. Incidentally, FIG. 1 is illustrated so that the front side is positioned at the near side on a paper sheet of FIG. 1. In each figure, "Fr" indicates a "front side", "Rr" indicates a "rear side", "L" indicates a "left side", "R" indicates a "right side", "U" indicates an "upper side" and "D" indicates a "lower side".

With reference to FIG. 1, the entire structure of a printer 1 as an example of an image forming apparatus will be described. FIG. 1 is a sectional view schematically showing an internal structure of a printer 1.

The printer 1 includes an apparatus body 2 constituting a roughly rectangular parallelepiped shaped external appearance. At a lower side of the apparatus body 2, a sheet feeding cartridge 3 storing sheets S (mediums) made of paper is detachably attached. In an upper face of the apparatus body 2, an ejected sheet tray 4 is formed. Incidentally, the sheet S is not restricted by the paper, but may be made of resin.

In addition, the printer 1 includes a sheet feeding device 5, an imaging device 6 and a fixing device 7 inside the apparatus body 2. The sheet feeding device 5 is arranged at an upstream end of a conveying path 8 extended from the sheet feeding cartridge 3 to the ejected sheet tray 4. The fixing device 7 is arranged at a downstream side of the conveying path 8 and the imaging device 6 is arranged between the sheet feeding device 5 and the fixing device 7 in the conveying path 8.

The imaging device 6 includes a toner container 10, a drum unit 11 and an optical scanning device 12. The toner container 10 contains, for example, a toner (a developer) of black color. The drum unit 11 includes a photosensitive drum 13, a charging device 14, a developing device 15 and a transfer roller 16. The transfer roller 16 comes into contact with the photosensitive drum 13 from a lower side to form a transferring nip.

A controlling device (not shown) of the printer 1 fittingly controls each component to execute image forming process as follows. The charging device 14 electrically charges a surface of the photosensitive drum 13. The photosensitive drum 13 receives scanning light radiated from the optical scanning device 12 and carries an electrostatic latent image. The developing device 15 develops the electrostatic latent image of the photosensitive drum 13 to a toner image by using the toner supplied from the toner container 10. The sheet feeding device 5 feeds the sheet S from the sheet feeding cartridge 3 to the conveying path 8. The transfer roller 16 transfers the toner image on the photosensitive drum 13 to the sheet S passing through the transferring nip. The fixing device 7 heats and fixes the toner image onto the sheet S. Subsequently, the sheet S is ejected to the ejected sheet tray 4.

Figure 2:
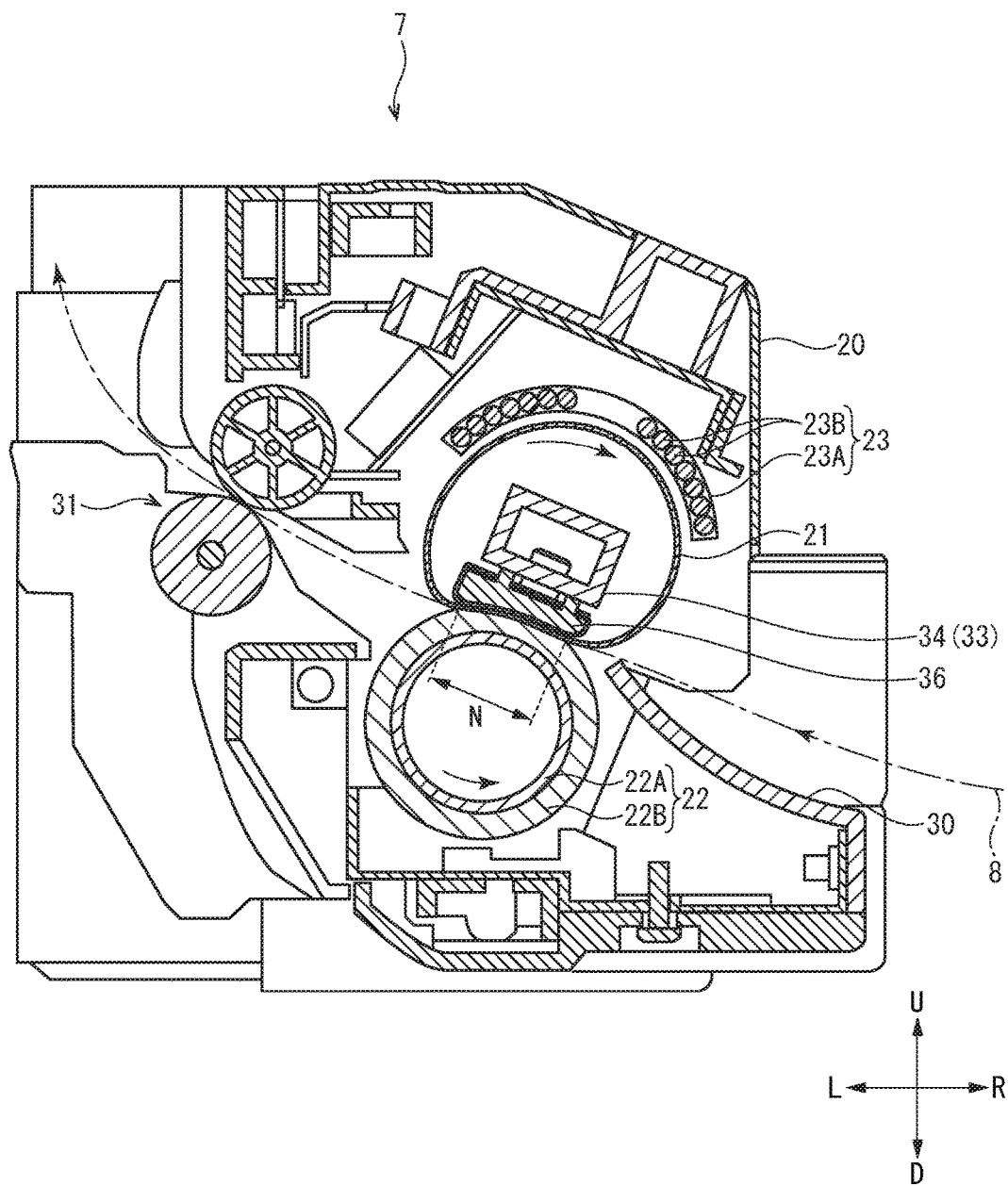
FIG. 2 is a sectional view showing a fixing device according to the embodiment of the present disclosure.
Figure 3:
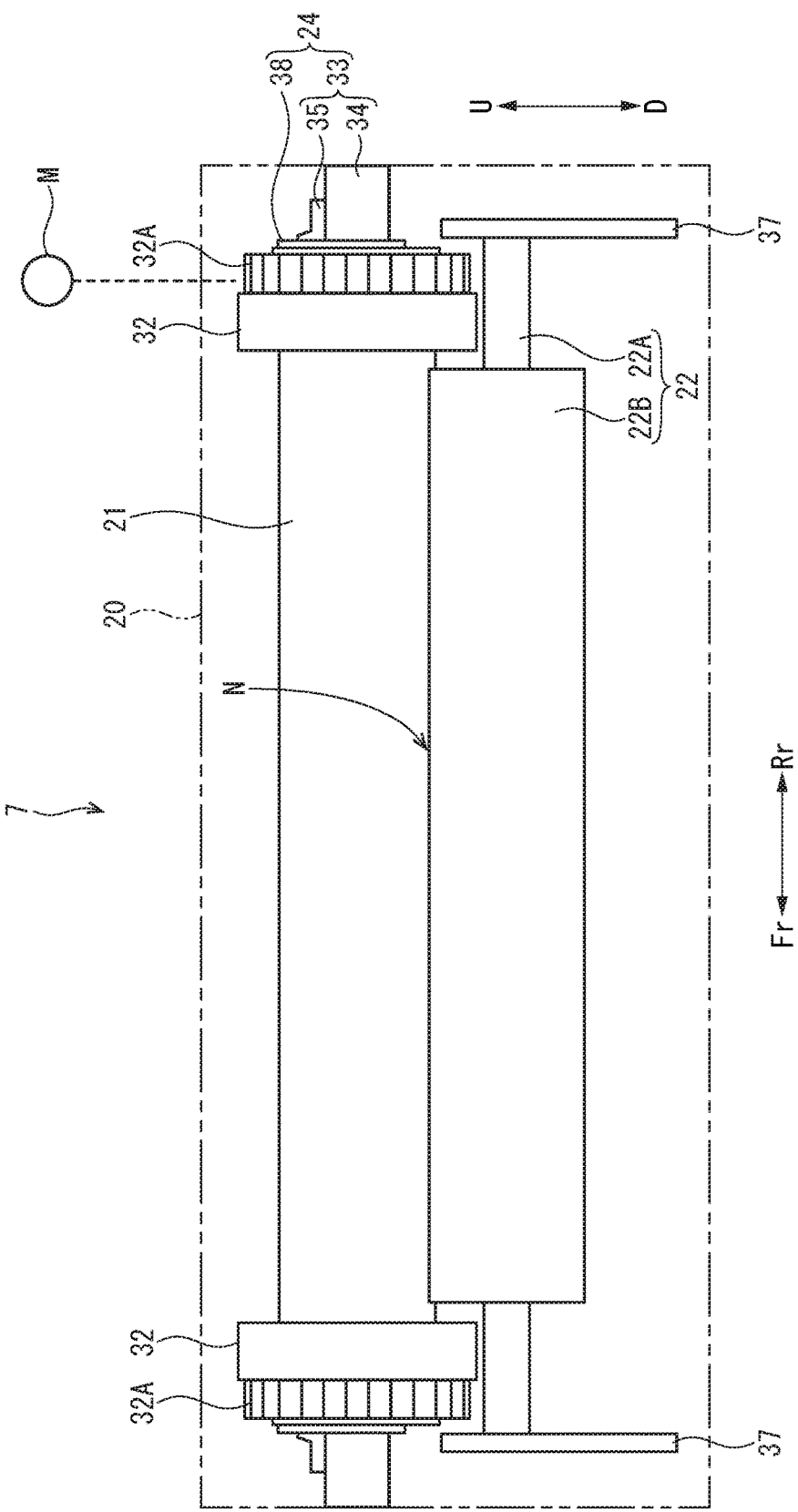
FIG. 3 is a side view schematically showing an internal structure of the fixing device according to the embodiment of the present disclosure.
Figure 4:
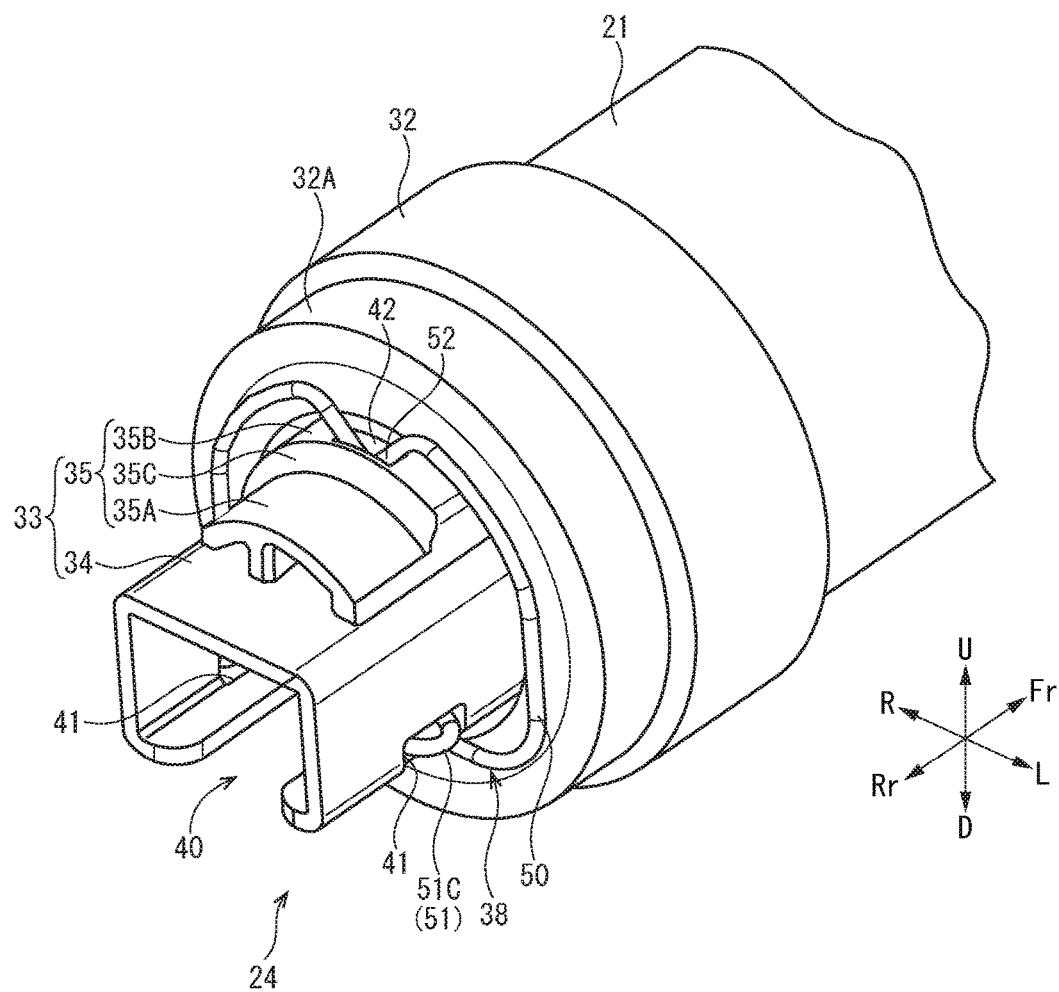
FIG. 4 is a perspective view showing rear portions of a coming-off stopping mechanism and other parts according to the embodiment of the present disclosure.
Figure 5:
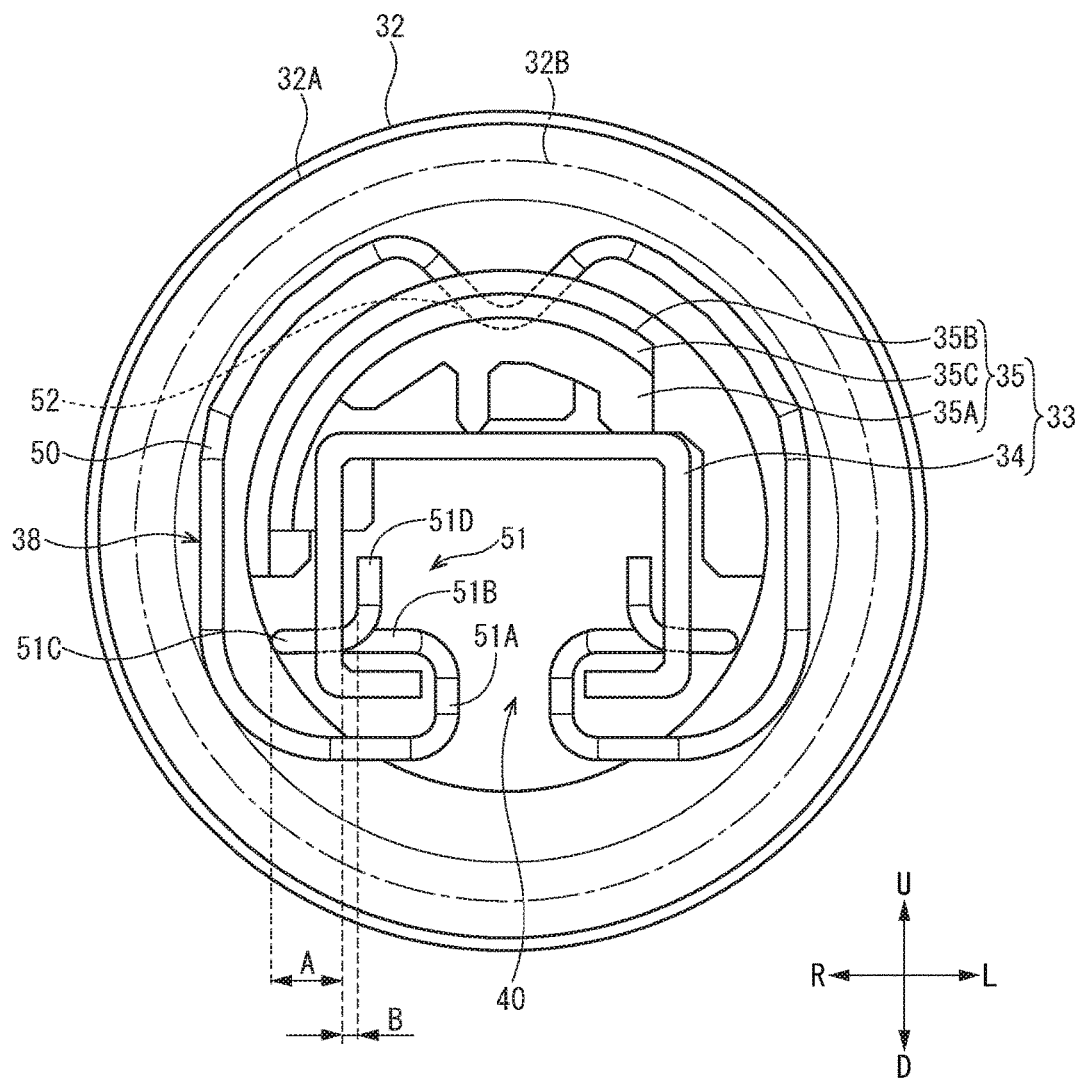
FIG. 5 is a rear view showing the rear portions of the coming-off stopping mechanism and other parts according to the embodiment of the present disclosure.

Next, with reference to FIGS. 2-5, the fixing device 7 will be described. FIG. 2 is a sectional view showing the fixing device 7. FIG. 3 is a side view showing an internal structure of the fixing device 7. FIG. 4 is a perspective view showing rear portions of a coming-off stopping mechanism 24 and other parts. FIG. 5 is a rear view showing the rear portions of the coming-off stopping mechanism 24 and other parts. Incidentally, in the specification, terms of "upstream" and "downstream" and similar terms to these indicate "upstream" and "downstream" in a conveying direction of the sheet S and similar matters to these.

In the fixing device 7, a belt fixing manner using a fixing belt 21 with small heat capacity is applied so that setting temperature is obtained in a short time. As shown in FIGS. 2 and 3, the fixing device 7 includes a housing 20, the fixing belt 21, a pressuring roller 22, a heating unit 23 and the coming-off stopping mechanism 24. The housing 20 is supported by the apparatus body 2 (refer to FIG. 1). The fixing belt 21 and the pressuring roller 22 are arranged inside the housing 20. The heating unit 23 has a function heating the fixing belt 21. The coming-off stopping mechanism 24 has a function restraining movement of the fixing belt 21 in forward and backward directions (an axial direction).

As shown in FIGS. 2 and 3, the housing 20 is formed in a roughly rectangular parallelepiped shape elongated in the forward and backward directions. As shown in FIG. 2, inside the housing 20, a part of the conveying path 8 through which the sheet S passes is formed. In both left and right faces of the housing 20, openings communicating to the conveying path 8 inside the housing 20 are formed. In the opening at a side of the right face of the housing 20, an entry guide 30 guiding the sheet S to a contact portion (a pressuring area N) of the fixing belt 20 and the pressuring roller 22 is arranged. In the opening at a side of the left face of the housing 20, a pair of conveying rollers 31 feeding the sheet S to a downstream side are arranged.

As shown in FIGS. 2 and 3, the fixing belt 21 as an example of a fixing member is an endless belt and is formed in a roughly cylindrical shape elongated in the forward and backward directions. The fixing belt 21 is formed, for example, by synthetic resin or the like having heat resistant property and elasticity.

As shown in FIGS. 3-5, to both front and rear ends of the fixing belt 21, a pair of caps 32 as an example of a rotating body are attached. Each cap 32 is formed in a roughly annular shape having an outer diameter larger than an outer diameter of the fixing bet 21. Each cap 32 has a shape keeping part 32B coming into contact with an inner circumference face of the fixing belt 21 in a state sliding on the inner circumference face. The shape keeping part 32B supports the inner circumference face of the fixing belt 21, and thereby, the fixing belt 21 is kept in a roughly cylindrical shape.

Moreover, in an outside face of each cap 32 in the axial direction, a fixing gear 32A is integrally formed. The fixing gear 32A is a so-called spur gear and is arranged coaxially with the cap 32. In the embodiment, to the fixing bear 32A of the rear cap 32, a driving motor M (refer to FIG. 3) is connected via an intermediate gear (not shown). Incidentally, the driving motor M is connected to any one of the pair of conveying rollers 31 via a gear train and others.

As shown in FIGS. 2, 4 and 5, inside the fixing belt 21, a supporting member 33 and a pressing pad 36 are arranged. The supporting member 33 includes a supporting metal plate 34 and a slide member 35 fixed on an upper face of the supporting metal plate 34. The pressing pad 36 is fixed on a lower face of the supporting metal plate 34 (refer to FIG. 2).

The supporting metal plate 34 is formed in a roughly hollow rectangular tubular shape elongated in the forward and backward directions (the axial direction) by metal, such as iron or aluminum alloy. The supporting metal plate 34 has a cross section in a roughly rectangular elongated in left and right directions as viewed from a front side. The supporting metal plate 34 penetrates the fixing belt 21 and the pair of caps 32 in the forward and backward directions and is fixed on both front and rear walls of the housing 20 (refer to FIG. 3).

As shown in FIGS. 4 and 5, the slide member 35 is formed, for example, in a plate shape having an arcuate cross section by synthetic resin or the like having heat resistant property. The slide member 35 includes a small diameter portion 35A, a large diameter portion 35B formed with a larger diameter than the small diameter portion 35A and a inclined face portion 35C connecting the small diameter portion 35A and the large diameter portion 35B. The small diameter portion 35A is located at the outside from the large diameter portion 35B in the axial direction and the inclined face portion 35C is provided between the small diameter portion 35A and the large diameter portion 35B. The inclined face portion 35C is inclined upwardly from the small diameter portion 35A to the large diameter portion 35B. An upper face (a surface) of the slide member 35 (the small diameter portion 35A and the large diameter portion 35B) is curved along an inner circumference face of the cap 32 (the fixing gear 32A). The inner circumference face of the cap 32 coming into contact with the surface of the large diameter portion 35B in a state sliding on the surface, and thereby, the fixing belt 21 is supported outside the supporting member 33 so as to rotate around an axis via the cap 32.

As shown in FIG. 2, the pressing pad 36 is formed in a roughly rectangular parallelepiped shape elongated in the forward and backward directions by synthetic resin or the like having heat resistant property. The pressing pad 36 has a function receiving the fixing belt 21 pressured by the pressuring roller 22.

As shown in FIGS. 2 and 3, the pressuring roller 22 as a pressuring member is formed in a roughly cylindrical shape elongated in the forward and backward directions. The pressuring roller 22 includes a core metal 22A made of metal and an elastic layer 22B of silicon sponge or the like laminated on an outer circumference face of the core metal 22A.

As shown in FIG. 3, both front and rear ends of the pressuring roller 22 (the core metal 22A) is rotatably supported by a pair of movable frames 37 (a frame). Each movable frame 37 is supported by the housing 20 in a swing state in upward and downward directions. To each movable frame 37, a pressure changing mechanism (not shown) including a spring, an eccentric cam and others is connected. When the pressure changing mechanism turns each movable frame 37 upwardly (to a side of the fixing belt 21), the pressuring roller 22 is pressured to the fixing belt 21 to form the pressuring area N between the fixing belt 21 and the pressuring roller 22. On the other hand, When the pressure changing mechanism turns each movable frame 37 downwardly (to a direction separating from the fixing belt 21), pressuring of the pressuring roller 22 to the fixing belt 21 is released. Incidentally, the pressuring area N indicates an area within a range from an upstream side position where the pressure is 0 Pa to a downstream side position where the pressure is 0 Pa again via a position where the pressure is a maximum.

As shown in FIG. 2, the heating unit 23 is located above the fixing belt 21 across a gap. The heating unit 23 includes a unit case 23A and an IH coil 23B. The unit case 23A is formed in a roughly semicylindrical shape elongated in the forward and backward directions so as to be along an upper side of an outer face of the fixing belt 21. The IH coil 23B is provided inside the unit case 23A. A high frequency current is flowed to the IH coil 23B to produce a magnetic field, and thereby, the upper side of the fixing belt 21 is heated. Incidentally, in the housing 20, a temperature sensor (not shown) sensing surface temperature of the fixing belt 21 is arranged. Incidentally, in the embodiment, although the heating unit 23 as a heat source is arranged outside the fixing belt 21, instead of this, a halogen heater, a carbon heater or the like may be arranged inside the fixing belt 21.

As shown in FIGS. 3-5, the coming-off stopping mechanism 24 includes the supporting member 33 as described above and a pair of coming-off stopping members 38. The supporting member 33 is provided in a state penetrating the fixing belt 21 in the forward and backward directions (the axial direction). The pair of coming-off stopping members 38 are attached to both front and rear sides of the supporting member 33. Incidentally, because structures of both front and rear sides of the supporting member 33 are roughly same shapes, the structure of the rear side the supporting member 33 will be described hereinafter. In addition, on the basis of similar reason, the rear coming-off stopping member 38 will be described.

As shown in FIGS. 4 and 5, the supporting metal plate 34 of the supporting member 33 has notch portions 40 at both ends in the axial direction. The notch portion 40 is formed in a roughly rectangular shape by cutting a lower wall of the supporting metal plate 34 from the rear end to the front side. In addition, at a rear side of the supporting metal plate 34, a pair of first engaging holes are formed. Each first engaging hole 41 is a hole penetrating in a thickness direction at a position separated from the rear end of the supporting metal plate 34 to a slightly front side. The pair of first engaging holes 41 are formed in roughly rectangular shapes elongated in the forward and backward directions along a pair of corner portions composed of both left and right walls and a lower wall of the supporting metal plate 34.

As shown in FIG. 4, in the slide member 35 of the supporting member 33, one second engaging hole 42 is formed. The second engaging hole 42 is a depression formed near a top portion (an uppermost portion) of the large diameter portion 35B of the slide member 35. The second engaging hole 42 is formed in a roughly rectangular shape elongated in the left and right directions.

Figure 6A:
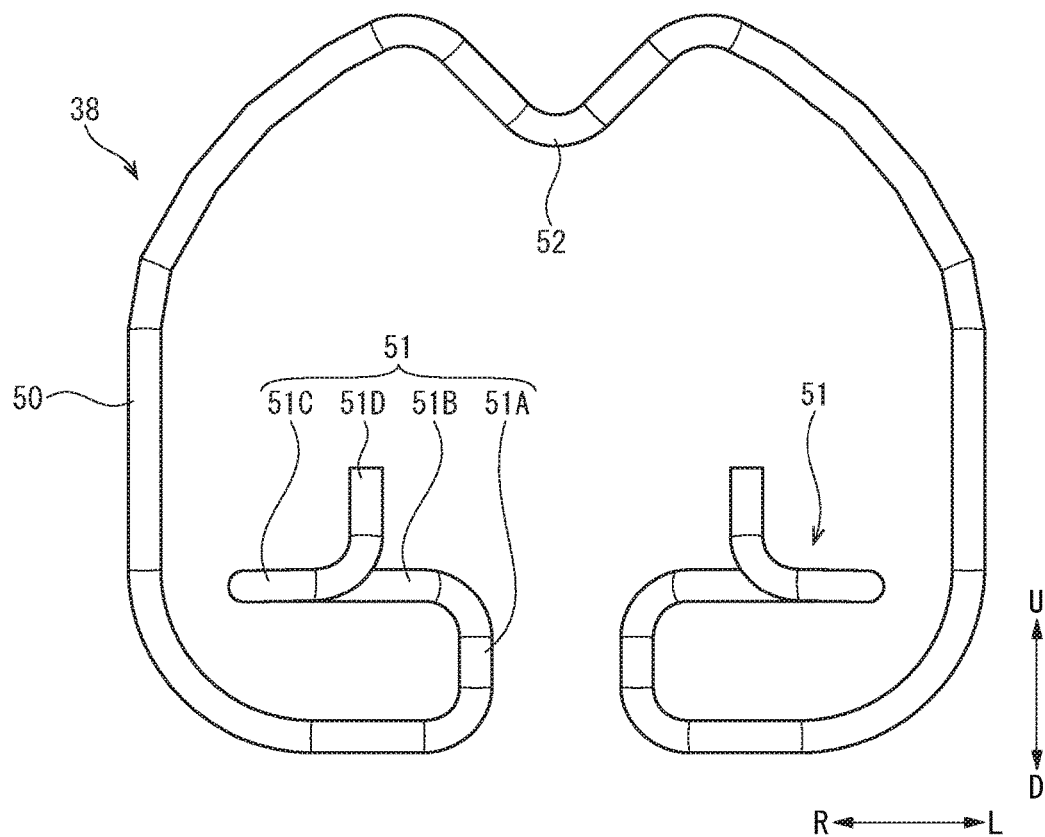
FIG. 6A is a rear view showing the coming-off stopping member of the coming-off stopping mechanism according to the embodiment of the present disclosure.
Figure 6B:
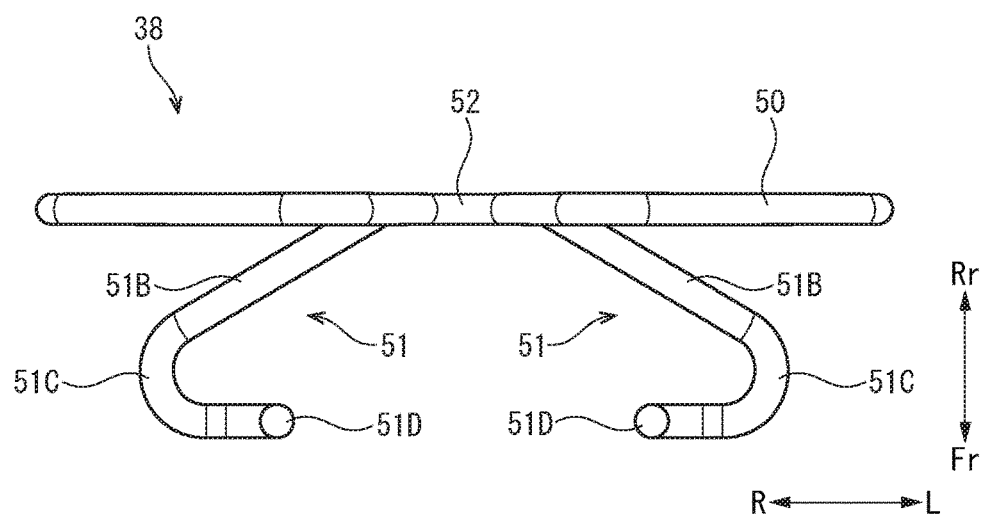
FIG. 6B is a plane view showing the coming-off stopping member of the coming-off stopping mechanism according to the embodiment of the present disclosure.

Next, with reference to FIGS. 4, 5, 6A and 6B, the coming-off stopping member 38 will be described in detail. FIG. 6A is a rear view showing the coming-off stopping member 38. FIG. 6B is a plane view showing the coming-off stopping member 38.

As shown in FIGS. 4 and 5, the coming-off stopping member 38 is a member fixed by being fitted to the supporting member 33 from the rear side (the outside in the axial direction) so that the supporting member 33 is inserted into the coming-off stopping member 38. The coming-off stopping member 38 is made of metal having elasticity. the coming-off stopping member 38 includes a annular portion 50, a pair of first engaging portions 51 and a second engaging portion 52.

As shown in FIGS. 5, 6A and 6B, the annular portion 50 is formed so as to enclose the outside of the supporting member 33 except for the notch portion 40. That is, the annular portion 50 is formed in a roughly C-shape in which its lower portion is opened.

The pair of first engaging portions 51 are connected to both ends of the annular portion 50. The pair of first engaging portions 51 are formed in a state being bent from both ends of the annular portion 50 so as to make a U-turn toward a curvature center of the annular portion 50 (upwardly) and being extended in directions separating from each other. The pair of first engaging portions 51 are formed in bilateral symmetry as viewed from a rear face (a front face). In detail, the pair of first engaging portions 51 include respective proximal end extending portions 51A, guiding inclined portions 51B, engaging protruded portions 51C and distal end extending portions 51D.

As shown in FIGS. 5 and 6A, a pair of the proximal end extending portions 51A are formed in a state extended from both ends of the annular portion 50 roughly vertical-upwardly.

As shown in FIS. 6B, a pair of the guiding inclined portions 51B are formed in a state extended from distal ends of the pair of proximal end extending portions 51A diagonal-backwardly. The pair of guiding inclined portions 51B are inclined from a downstream side (a front side) to an upstream side (a rear side) in a fitting direction of the coming-off stopping member 38 while gradually separating from each other. A pair of the engaging protruded portions 51C are bent inwardly from distal ends of the pair of guiding inclined portions 51B so as to make a U-turn toward an inner side in a diameter direction. Each guiding inclined portion 51B and each engaging protruded portion 51C are formed at the roughly same level (on the roughly same horizontal plane) (refer to FIG. 6A). The pair of guiding inclined portions 51B and the pair of engaging protruded portions 51C are formed in shapes protruded to the outside in the left and right directions in a range of an inner diameter of the annular portion 50 (refer to FIG. 6A).

As shown in FIGS. 5 and 6A, a pair of the distal end extending portions 51D are formed in a state extended from distal ends of the pair of engaging protruded portions 51C roughly vertical-upwardly. The pair of distal end extending portions 51D (the distal ends of the pair of engaging protruded portions 51C) are positioned at the outside from the pair of proximal end extending portions 51A in the left and right directions.

The second engaging portion 52 is formed so as to protrude from a part of the annular portion 50 inwardly. In detail, the second engaging portion 52 is formed in a state that the vicinity of a top portion (an uppermost portion) of the annular portion 50 is bent toward a curvature center of the annular portion 50 (downwardly) in a roughly V-shape.

Figure 7:
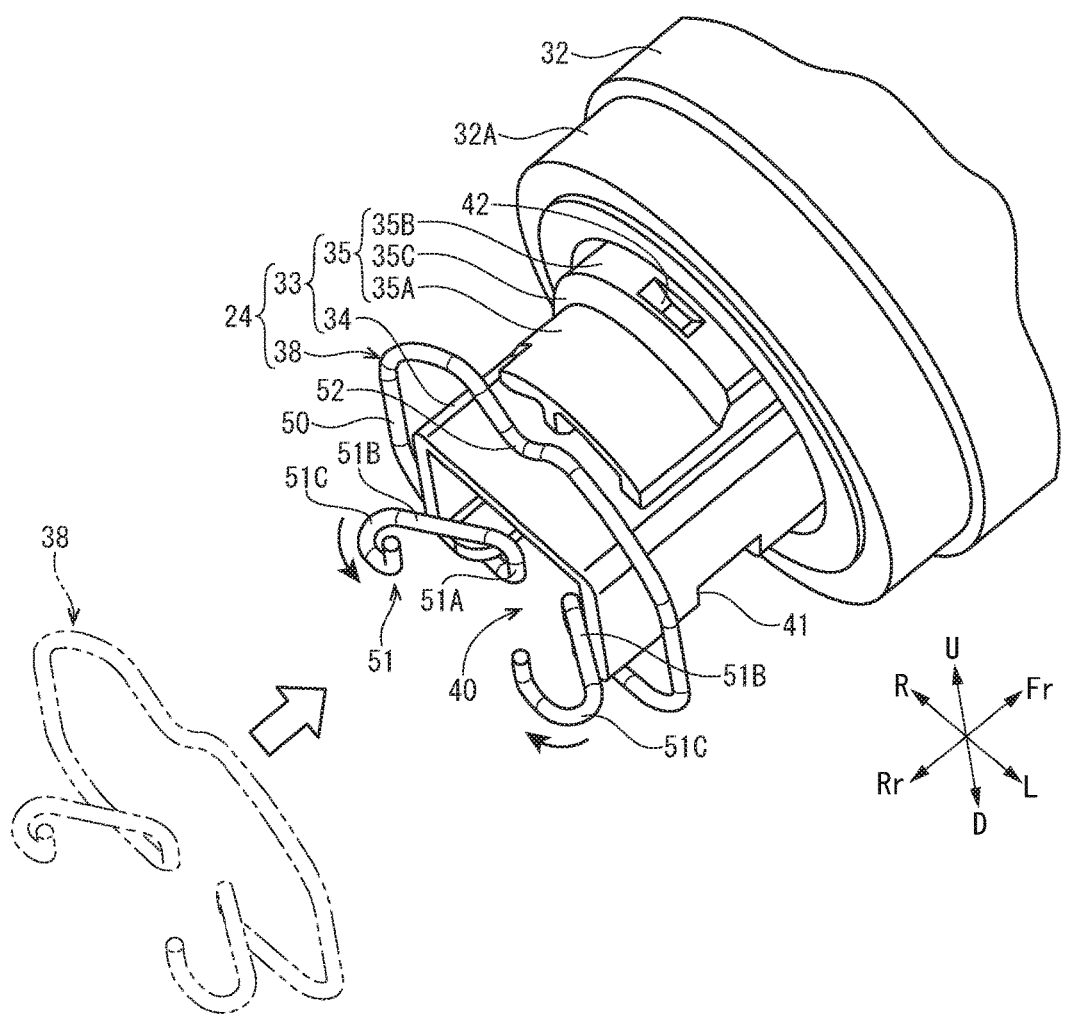
FIG. 7 is a perspective view showing the coming-off stopping mechanism, in a state that the coming-off stopping member acts, according to the embodiment of the present disclosure.

With reference to FIG. 7, action of the coming-off stopping mechanism 24 will be described. Concretely, procedure of attaching the coming-off stopping member 38 to the supporting member 33 will be described. FIG. 7 is a perspective view of the coming-off stopping mechanism 24 useful of explaining action of the coming-off stopping mechanism 24. Incidentally, to the supporting member 33, the fixing belt 21 and the cap 32 are rotatably supported. For simplicity of explanation, a case where the coming-off stopping member 38 is attached to the rear side of the supporting member 33 will be described.

The coming-off stopping member 38 is located at a rear side from the supporting member 33 (refer to two-dot chain line in FIG. 7) and is moved in parallel from a rear side to a front side (refer to an outline arrow in FIG. 7). As a result, a rear part of the supporting member 33 is relatively moved to a rear side and penetrates the inside of the annular portion 50. At this time, the pair of guiding inclined portions 51B come into contact with the rear end of the supporting metal plate 34.

In such a situation, if the coming-off stopping member 38 is pushed against the supporting member 33, the pair of proximal end extending portions 51A start being warped by inward turning so that respective facing sides are rotated in a pushing direction (refer to arc arrows in FIG. 7), the pair of guiding inclined portions 51B are inserted into the inside of the supporting metal plate 34 while coming into contact with the rear end of the supporting metal plate 34. If the coming-off stopping member 38 is further pushed against the supporting member 33, outmost parts of the pair of engaging protruded portions 51C are moved forwardly while coming into contact with inner faces of both left and right walls of the supporting metal plate 34. Moreover, a lowermost part of the second engaging part 52 is moved to an upper face of the inclined face portion 35C while coming into contact with an upper face of the small diameter portion 35A of the slide member 35.

When the pair of engaging protruded portions 51C are moved to the pair of first engaging holes 41, because the pair of proximal end extending portions 51A warped by inward turning are rotated by outward turning by its own elastic force (returns to an original state), the pair of engaging protruded portions 51C are fitted into the pair of first engaging holes 41 from the inside of the supporting metal plate 34. On the other hand, the second engaging part 52 is moved from the inclined face portion 35C to the large diameter portion 35B and fitted into the second engaging hole 42 from the outside of the supporting member 33.

By a manner described above, as shown in FIGS. 4 and 5, the coming-off stopping member 38 becomes a state making three engaging portions 51, 52 fitted into three engaging holes 41, 42 and coming into contact with a rear end face of the fixing gear 32A. In this state, the coming-off stopping member 38 restrains movement toward the outside in the axial direction of the cap 32 (the fixing gear 32A) supported by the supporting member 33. Thereby, it is possible to restrain deviation in the axial direction of the fixing belt 21 and to stabilize rotation of the fixing belt 21 around the axis. Incidentally, the pair of engaging protruded portions 51C penetrate the first engaging holes 41 and are protruded to the outside from both left and right walls of the supporting metal plate 34. Moreover, as shown in FIG. 5, an insertion amount A of the engaging protruded portion 51C to the first engaging hole 41 is set so as to become longer than a gap B between the distal end extending portion 51D and an inner face of the wall of the supporting metal plate 34.

Here, mainly with reference to FIG. 2, action (fixing process) of the fixing device 7 will be described. In a case where the fixing process (image forming process) is executed, the pressuring roller 22 is pressured to the fixing belt 21 by the pressure changing mechanism.

First, the controlling device controls drive of the driving motor M and the heating unit 23. The fixing belt 21 is rotated in a clockwise direction in FIG. 2 by receiving drive force of the driving motor M. The pressuring roller 22 is rotated in a counter clockwise direction in FIG. 2 by following the fixing belt 21. The heating unit 23 heats the fixing belt 21. The temperature sensor transmits a detection signal indicating temperature of the fixing belt 21 (or the heating unit 23) via an inputting circuit. The controlling device receives a detection signal indicating reaching of the setting temperature and start execution of the image forming process as described above.

The sheet S having the transferred toner image is inserted into the housing 20 and the fixing belt 21 heats the toner (the toner image) on the sheet S passing through the pressuring area N while rotating around the axis. The pressuring roller 22 pressures the toner on the sheet S passing through the pressuring area N while rotating around the axis. Thereby, the toner image is fixed on the sheet S. Subsequently, the sheet S having the fixed toner image is fed out to the outside of the housing 20 by the pair of conveying rollers 31 and finally ejected to the ejected sheet tray 4.

The coming-off stopping mechanism 24 according to the embodiment as described above is configured so that the pair of first engaging portions 51 are inserted into the inside of the supporting metal plate 34 (the supporting member 33) from the notch portion 40 while elastically deforming and is fitted into the pair of first engaging holes 41 from the inside. In accordance with such a configuration, in a case where the coming-off stopping member 38 is broadened in the diameter direction by receiving force in the rotating direction from the cap (the fixing gear 32A), since force in a direction pushing the first engaging portion 51 into the first engaging hole 41 acts on the coming-off stopping member 38, it is possible to maintain a state that first engaging portion 51 is fitted into the first engaging hole 41. Thereby, it is possible to restrain coming-off of the coming-off stopping member 38 from the supporting member (the supporting metal plate 34). In addition, the coming-off stopping mechanism 24 is configured so that the coming-off stopping member 38 is fitted to the supporting metal plate 34 (the supporting member 33) from the outside in the axial direction and the first engaging portion 51 comes into contact with the inner face of the supporting metal plate 34. In accordance with such a configuration, since the first engaging portion 51 does not comes into contact with the outer face of the supporting metal plate (the supporting member 33) at a step when the coming-off stopping member 38 is fitted to the supporting metal plate 34, it is possible to restrain damage of the outer face (the outside) of the supporting member 33.

Moreover, the coming-off stopping mechanism 24 according to the embodiment is configured so that the pair of first engaging portions 51 are fitted into the pair of first engaging holes 41 from the inside of the supporting metal plate 34 and one second engaging portion 52 is fitted into one second engaging hole 42 from the outside of the supporting member 33. In accordance with such a configuration, since the coming-off stopping member 38 sandwiches (clamps) the supporting member 33 from the inside and the outside and is supported at three points to the supporting member 33, it is possible to fix the coming-off stopping member 38 onto a plane face (a vertical plane face) intersecting the supporting member 33 (at right angles). Thereby, it is possible to stabilize a state that the coming-off stopping member 38 is attached to the supporting member 33.

Further, the coming-off stopping mechanism 24 according to the embodiment is configured so that the pair of guiding inclined portions 51B are inserted into the inside of the supporting metal plate 34 while coming into contact with the end in the axial direction of the supporting metal plate 34 (the supporting member 33), and thereby, the pair of first engaging portions 51 are elastically deformed. In accordance with such a configuration, since the pair of guiding inclined portions 51B come into contact with the end of the supporting metal plate 34 at a step when the coming-off stopping member 38 is fitted to the supporting member 33, it is possible to elastically deform the pair of first engaging portions 51 in a direction approaching to each other. Thereby, it is possible to smoothly insert the pair of first engaging portions 51 into the inside the supporting metal plate 34. As a result, it is possible to easily carry out attaching operation of the coming-off stopping member 38 to the supporting member 33.

Furthermore, in accordance with the fixing device according to the embodiment, since the coming-off stopping member 38 can be securely fitted to the supporting member 33, it is possible to restrain deviation of the fixing belt 21 and the cap 32 (the fixing gear 32A) in the axial direction. Thereby, since it is possible to stabilize rotation of the fixing belt 21 around the axis, it is possible to secure suitable execution of the fixing process.

Figure 8:
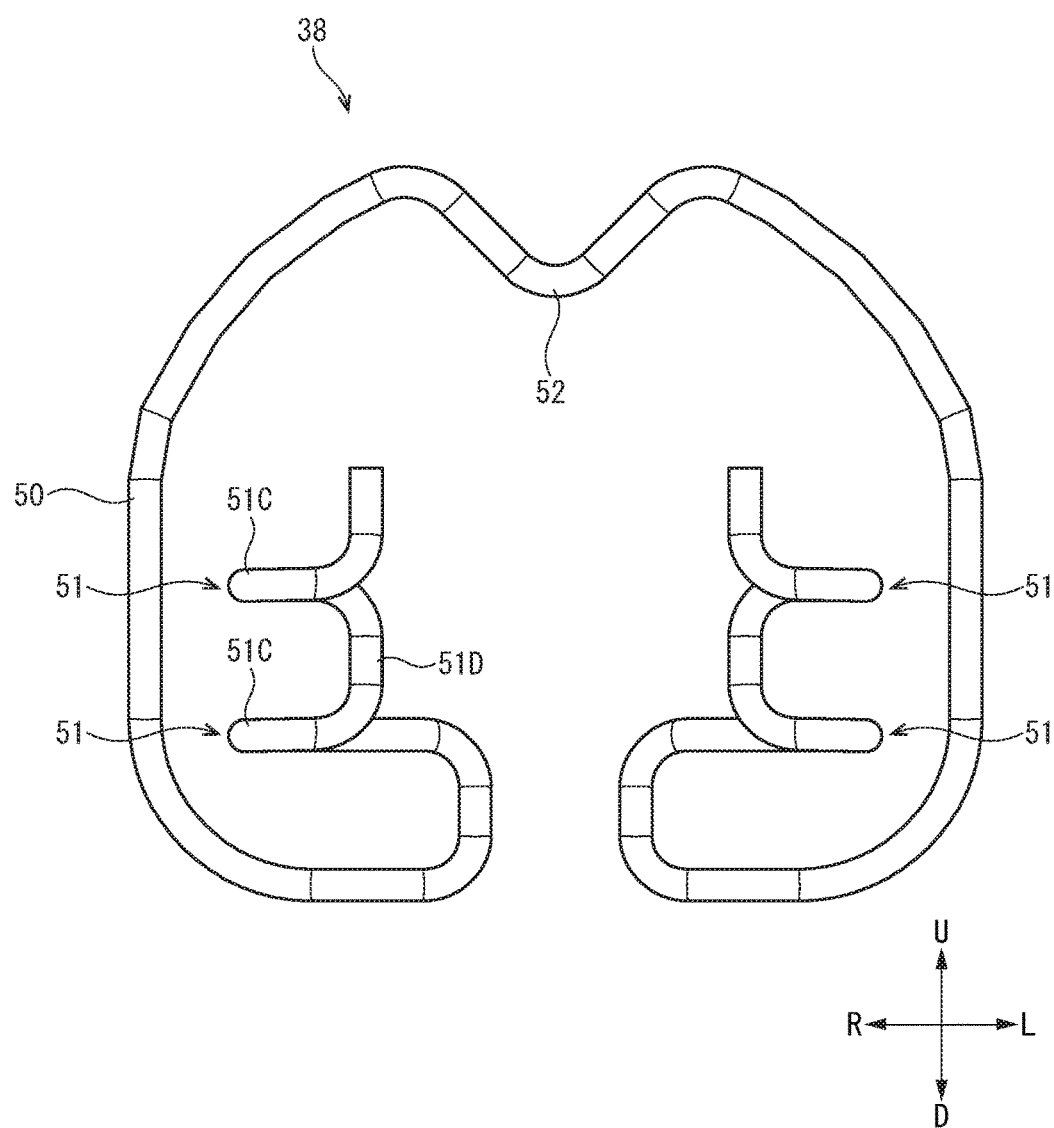
FIG. 8 is a rear view showing the coming-off stopping member of the coming-off stopping mechanism according to a modified example of the embodiment of the present disclosure.
Figure 9:
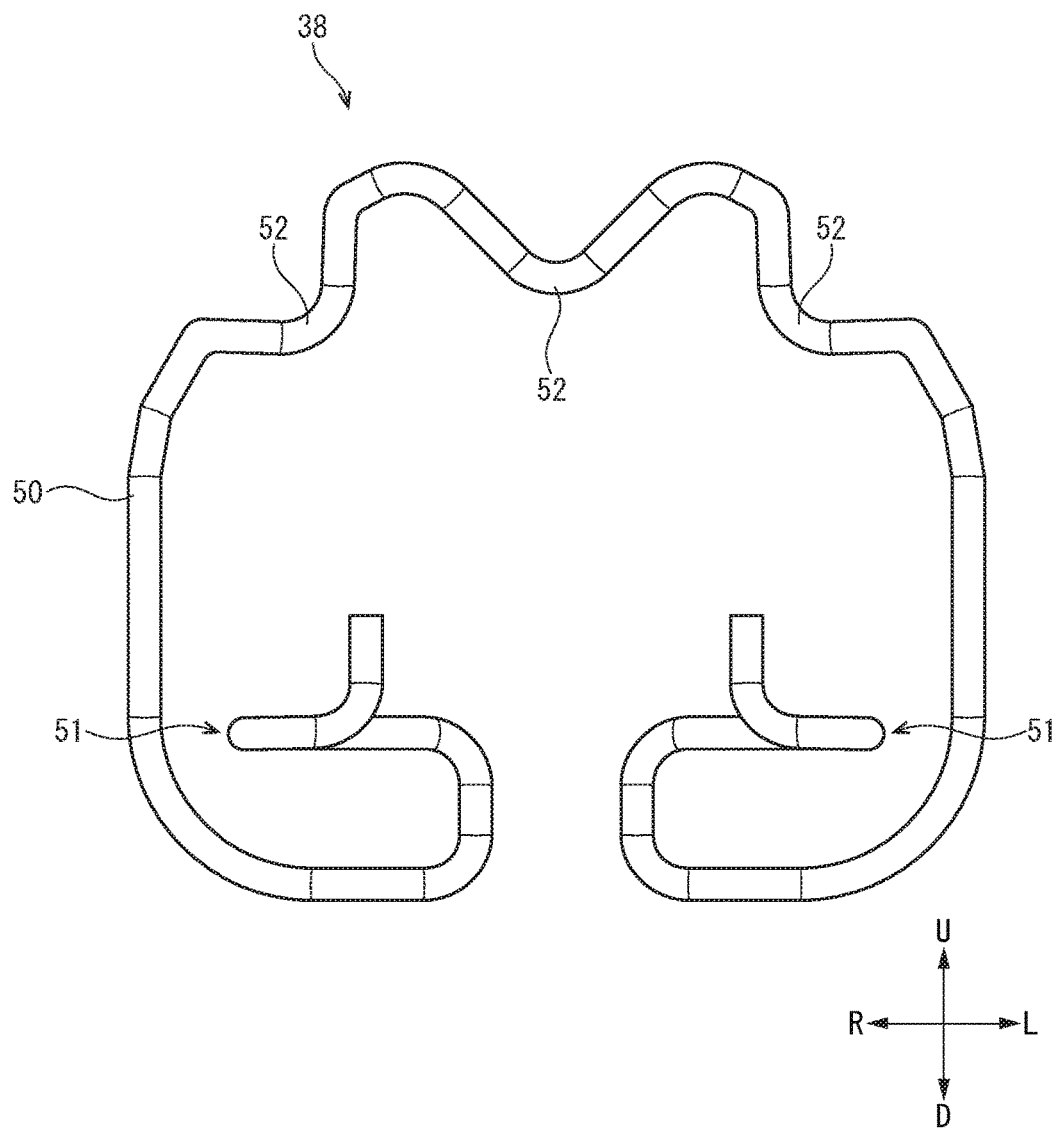
FIG. 9 is a rear view showing the coming-off stopping member of the coming-off stopping mechanism according to another modified example of the embodiment of the present disclosure.

Incidentally, although, in the coming-off stopping mechanism 24 according to the embodiment, as an example, the pair of first engaging portions 51 (the pair of engaging protruded portions 51C) and the pair of first engaging holes 41, and one second engaging portion 52 and one second engaging hole 42 are provided, the present disclosure is not restricted by this example. As another example, as shown in FIG. 8, four first engaging portions may be formed by further extending the distal end extending portion 51D. Moreover, as shown in FIG. 9, three second engaging portions 52 may be formed in the annular portion 50. In these cases, it is preferable that four first engaging holes 41 corresponding to four first engaging portions 51 are formed in the supporting metal plate 34 and three second engaging holes 42 corresponding to three second engaging portions 52 are formed in the large diameter portion 35B. As described above, two or more first engaging portions 51 and two or more first engaging holes 41 may be provided. Moreover, one or more second engaging portions 52 and one or more second engaging holes 42 may be provided.

Incidentally, although, in the coming-off stopping mechanism 24 according to the embodiment, as an example, the first engaging hole 41 is a hole penetrating the supporting metal plate 34 in the thickness direction, the present disclosure is not restricted by this example. The first engaging hole 41 may be a depression formed in the inner face of the supporting metal plate 34. In addition, although, in the coming-off stopping mechanism 24 according to the embodiment, as an example, the second engaging hole 42 is a depression formed in the large diameter portion 35B, the present disclosure is not restricted by this example. the second engaging hole 42 may be a hole penetrating the large diameter portion 35B in the thickness direction.

Moreover, although the coming-off stopping mechanism 24 according to the embodiment restrains, as an example, movement of the fixing belt 21 in the axial direction, the present disclosure is not restricted by this example. As another example, the coming-off stopping mechanism 24 may be applied in order to restrain movement in an axial direction of a conveying roller or another rotating body rotating around an axis.

Further, although, in the fixing device 7 according to the embodiment, as an example of the fixing member, the fixing belt 21 rotating around one axis is applied, the present disclosure is not restricted by this example. As another example of the fixing member, a fixing roller having a core metal and an elastic layer laminated an outer circumference face of the core metal may be applied. In such a case, the coming-off stopping mechanism 24 may restrain movement in an axial direction of the fixing roller.

Furthermore, although, in the fixing device 7 according to the embodiment, as an example, the driving motor M drives rotation of the fixing belt 21, the present disclosure is not restricted by this example. As another example, the driving motor M may drive rotation of the pressuring roller 22. Moreover, although, in the fixing device 7 according to the embodiment, as an example, the pressuring roller 22 is pressured against the fixing belt 21 to form the pressuring area N, the present disclosure is not restricted by this example. As another example, the fixing belt 21 may be pressured against the pressuring roller 22 to form the pressuring area N.

The embodiment was described in a case of applying the configuration of the present disclosure to the monochrome printer 1. On the other hand, in another embodiment, the configuration of the disclosure may be applied to another image forming apparatus, such as a color printer, a copying machine, a facsimile or a multifunction peripheral.

Further, the above-description of the embodiments was described about one example of the coming-off stopping mechanism, the fixing device and the image forming apparatus according to the present disclosure. However, the technical scope of the present disclosure is not limited to the embodiments.

The invention claimed is:
1. A coming-off stopping mechanism comprising:
a supporting member formed in a hollow tubular shape elongated in an axial direction, having a notch portion at an end, and supporting a rotating body rotating around an axis; and
a coming-off stopping member fixed by being fitted to the supporting member from the outside in the axial direc- tion, and restraining movement toward the outside in the axial direction of the rotating body supported by the supporting member, wherein the coming-off stopping member includes:

an annular portion formed so as to enclose the outside in a diameter direction of the supporting member except for the notch portion; and a plurality of first engaging portions connected to both ends of the annular portion, and inserted into the inside of the supporting member from the notch portion while elastically deforming and fitted into a plurality of first engaging holes formed in the supporting member from the inside in the diameter direction.

2. The coming-off stopping mechanism according to claim 1, wherein the coming-off stopping member further includes:

a second engaging portion formed so as to protrude from a part of the annular portion inwardly, and fitted into a second engaging hole formed in the supporting member from the outside in a diameter direction.

3. The coming-off stopping mechanism according to claim 1, wherein the plurality of first engaging portions are a pair of first engaging portions, the pair of first engaging portions include a pair of guiding inclined portions formed so as to be inclined from a downstream side to an upstream side in a fitting direction of the coming-off stopping member while gradually separating from each other, the pair of guiding inclined portions are inserted into the inside of the supporting member while coming into contact with the end in the axial direction of the supporting member, and thereby, the pair of first engaging portions are elastically deformed.

4. The coming-off stopping mechanism according to claim 3, wherein each of the pair of first engaging portions includes:

a proximal end extending portion extended from the end of the annular portion;

the guiding inclined portion extended from a distal end of the proximal end extending portion;

an engaging protruded portion bent inwardly from a distal end of the guiding inclined portion; and a distal end extending portion extended from a distal end of the engaging protruded portion, the engaging protruded portion is fitted into the first engaging hole from the inside in the diameter direction.

5. The coming-off stopping mechanism according to claim 4, wherein the guiding inclined portion and the engaging protruded portion are formed on the same horizontal plane.

6. A fixing device comprising:

a fixing member heating a toner on a medium while rotating around an axis;

a pressuring member forming a pressuring area between the fixing member and the pressuring member while rotating around an axis to pressure the toner on the medium passing through the pressuring area; and the coming-off stopping mechanism according to claim 1, wherein the supporting member is arranged in a state penetrating the fixing member in the axis direction, the rotating body is attached to an end in the axial direction of the fixing member.

7. A fixing device comprising:

a fixing member heating a toner on a medium while rotating around an axis;

a pressuring member forming a pressuring area between the fixing member and the pressuring member while rotating around an axis to pressure the toner on the medium passing through the pressuring area; and the coming-off stopping mechanism according to claim 2, wherein the supporting member is arranged in a state penetrating the fixing member in the axis direction, the rotating body is attached to an end in the axial direction of the fixing member.

8. A fixing device comprising:

a fixing member heating a toner on a medium while rotating around an axis;

a pressuring member forming a pressuring area between the fixing member and the pressuring member while rotating around an axis to pressure the toner on the medium passing through the pressuring area; and the coming-off stopping mechanism according to claim 3, wherein the supporting member is arranged in a state penetrating the fixing member in the axis direction, the rotating body is attached to an end in the axial direction of the fixing member.

9. A fixing device comprising:

a fixing member heating a toner on a medium while rotating around an axis;

a pressuring member forming a pressuring area between the fixing member and the pressuring member while rotating around an axis to pressure the toner on the medium passing through the pressuring area; and the coming-off stopping mechanism according to claim 4, wherein the supporting member is arranged in a state penetrating the fixing member in the axis direction, the rotating body is attached to an end in the axial direction of the fixing member.

10. A fixing device comprising:

a fixing member heating a toner on a medium while rotating around an axis;

a pressuring member forming a pressuring area between the fixing member and the pressuring member while rotating around an axis to pressure the toner on the medium passing through the pressuring area; and the coming-off stopping mechanism according to claim 5, wherein the supporting member is arranged in a state penetrating the fixing member in the axis direction, the rotating body is attached to an end in the axial direction of the fixing member.

11. An image forming apparatus comprising the fixing device according to claim 6.

12. An image forming apparatus comprising the fixing device according to claim 7.

13. An image forming apparatus comprising the fixing device according to claim 8.

14. An image forming apparatus comprising the fixing device according to claim 9.

15. An image forming apparatus comprising the fixing device according to claim 10.

* * * * *